(12) United States Patent
Shiraki et al.

(10) Patent No.: US 11,228,369 B2
(45) Date of Patent: Jan. 18, 2022

(54) RECEIVING APPARATUS, RECEIVING METHOD, AND PROGRAM

(71) Applicant: NIPPON TELEGRAPH AND TELEPHONE CORPORATION, Tokyo (JP)

(72) Inventors: Yoshifumi Shiraki, Tokyo (JP); Takehiro Moriya, Tokyo (JP); Yutaka Kamamoto, Tokyo (JP); Takashi Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/269,486

(22) PCT Filed: Aug. 8, 2019

(86) PCT No.: PCT/JP2019/031288
§ 371 (c)(1),
(2) Date: Feb. 18, 2021

(87) PCT Pub. No.: WO2020/039950
PCT Pub. Date: Feb. 27, 2020

(65) Prior Publication Data
US 2021/0306070 A1  Sep. 30, 2021

(30) Foreign Application Priority Data

Aug. 23, 2018  (JP) .............................. JP2018-156078

(51) Int. Cl.
*H04B 10/00* (2013.01)
*H04B 10/079* (2013.01)
(Continued)

(52) U.S. Cl.
CPC ..... *H04B 10/07953* (2013.01); *H04B 10/116* (2013.01); *H04B 10/69* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| | | | |
|---|---|---|---|
| 2011/0052214 A1* | 3/2011 | Shimada .............. | H04B 10/116 398/202 |
| 2014/0286644 A1* | 9/2014 | Oshima ................. | H04B 10/11 398/118 |
| 2014/0354846 A1* | 12/2014 | Muguruma ........... | H04N 5/369 348/222.1 |

OTHER PUBLICATIONS

Komine et al. (2002) "Integrated System of White LED Visible—Light Communication and Electrical Power-Line Communication," IEICE Technical Report vol. 101, No. 726, pp. 99-104.
(Continued)

*Primary Examiner* — Daniel G Dobson (57) ABSTRACT

A sampling frequency required for symbol timing recovery is made smaller than that of the related art. A receiver 1 performs visible light communication with a transmitter 8. A received signal generating unit 112 measures an intensity of an electrical signal corresponding to an optical signal received from a transmitter 8 at a predetermined time interval to generate a sequence of received signals. A parameter estimation unit 12 uses a distribution of received signals estimated from the sequence of received signals to estimate any one or more parameters of a maximum luminance value, a synchronization shift, and a steady noise level, the one or more parameters including at least the maximum luminance value.

20 Claims, 6 Drawing Sheets

(51) Int. Cl.
*H04B 10/69* (2013.01)
*H04B 10/116* (2013.01)
*H04J 14/00* (2006.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118
See application file for complete search history.

(56) References Cited

OTHER PUBLICATIONS

Shida et al. (2007) "An Analysis of Transmission Speed Limitation in Parallel Wireless Visible Light Communication Systems," IEICE Technical Report, vol. 106, No. 450, pp. 37-41.

* cited by examiner

RECEIVING APPARATUS, RECEIVING METHOD, AND PROGRAM

CROSS-REFERENCE TO RELATED APPLICATIONS

This application is a U.S. 371 Application of International Patent Application No. PCT/JP2019/031288, filed on 8 Aug. 2019, which application claims priority to and the benefit of JP Application No. 2018-156078, filed on 23 Aug. 2018, the disclosures of which are hereby incorporated herein by reference in their entireties.

TECHNICAL FIELD

The present invention relates to a method for receiving information in communication using visible light and electromagnetic waves in the peripheral band of visible light.

BACKGROUND ART

In recent years, visible light sources are used not only for lighting applications for shining a light, but also for communication applications. Prevalence of light emitting diodes (LED) as a visible light source contributes to this. Although an amount of luminescence of one light emitting diode does not compare to that of a related-art visible light source such as an incandescent lamp or a fluorescent lamp, the light emitting diode is superior to a related-art visible light source in terms of its lifetime, size, and power consumption. In addition to the features described above, the light emitting diodes have the characteristic that the response rate is very fast. It is also easy to electrically control light emission of the light emitting diodes. Because the light emitting diodes have the characteristics described above, research and development have been conducted in recent years for lighting applications not only for shining a light, but also for signal transmission applications that utilize flashing of visible light. For example, Non Patent Literature 1 proposes performing communication by superimposing a signal on a household lighting device using a light emitting diode. In addition, because visible light is currently exempt from the regulation of the Radio Act, there is no band or power limitation, and the band and power can be taken large, and thus there is a research suggesting that the fact is utilized to use light emitting diodes exclusively for communication (for example, see Non Patent Literature 2). Communication performed using a visible light source such as a light emitting diode is referred to as visible light communication. In visible light communication, a photodetector or an image sensor that is an array of photodetectors is used as a light receiving element of a receiver. The photodetector can typically obtain signals in a continuous manner. On the other hand, the image sensor can acquire a large number of signals from the photodetector at a time, but can typically acquire only signals sampled at predetermined periods by nature. Herein, it is assumed that the image sensor is primarily used as a light receiving element.

Figure 1:
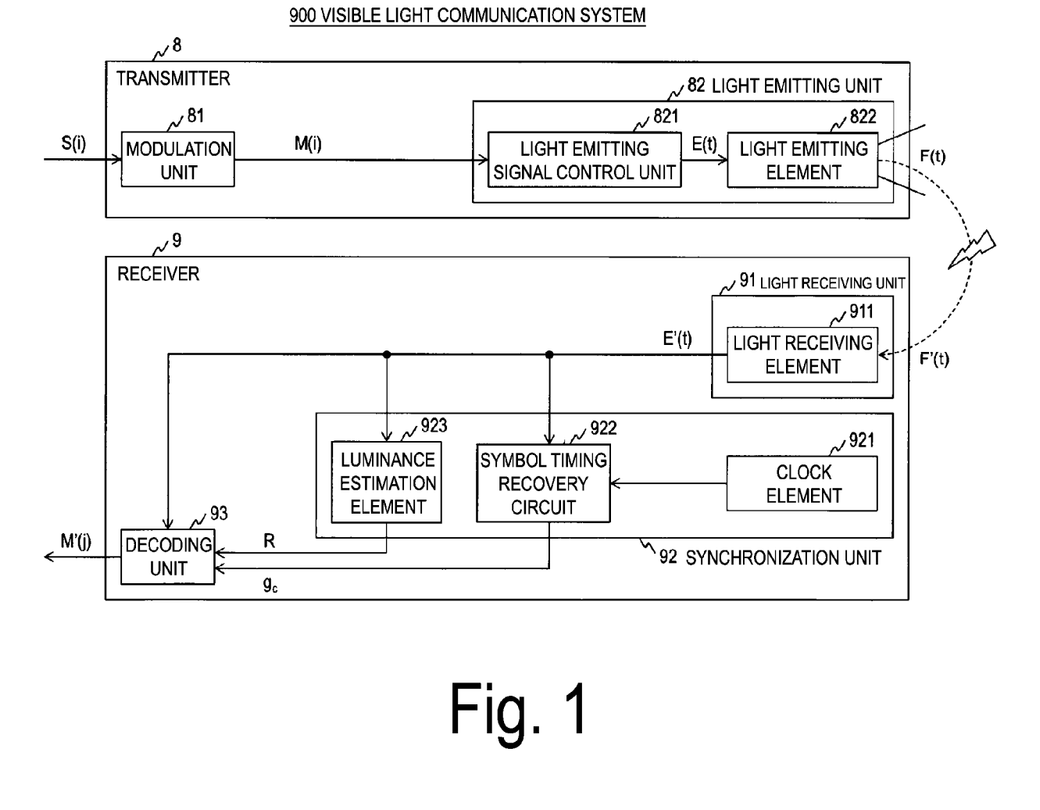
FIG. 1 is a diagram illustrating a functional configuration of a related-art visible light communication system.

A related-art visible light communication system is outlined below with reference to FIG. 1. FIG. 1 is a block diagram illustrating a functional configuration of a related-art visible light communication system 900. As illustrated in FIG. 1, the related-art visible light communication system 900 includes a transmitter 8 and a receiver 9. The transmitter 8 includes a modulation unit 81 and a light emitting unit 82. The receiver 9 includes a light receiving unit 91, a synchronization unit 92, and a decoding unit 93. The light emitting unit 82 included in the transmitter 8 includes a light emitting signal control unit 821 and a light emitting element 822. The light receiving unit 91 included in the receiver 9 includes a light receiving element 911. The synchronization unit 92 included in the receiver 9 includes a clock element 921, a symbol timing recovery circuit 922, and a luminance estimation element 923.

Figure 2A:
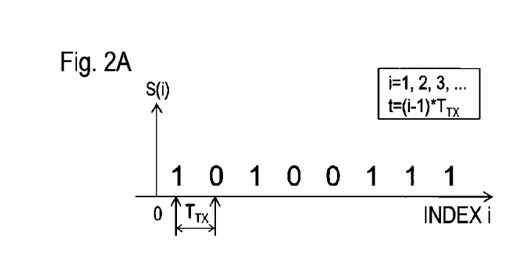
FIG. 2 is a diagram illustrating signals transmitted in visible light communication.

Hereinafter, a signal used in the visible light communication system 900 illustrated in FIG. 1 will be described with reference to FIG. 2. FIG. 2 is a diagram illustrating signals used in the related-art visible light communication system 900, where FIG. 2A illustrates an example of a transmission signal S(i), FIG. 2B illustrates an example of a modulated signal M(i), FIG. 2C illustrates an example of an electrical signal E(t) when a processing time $T_p$=0, FIG. 2D illustrates an example of an optical signal F(t) when the processing time $T_p$=0, FIG. 2E illustrates an example of the electrical signal E(t) when the processing time $T_p \neq 0$, and FIG. 2F illustrates an example of the optical signal F(t) when the processing time $T_p \neq 0$.

Transmitter 8: Modulation Unit 81

Figure 2B:
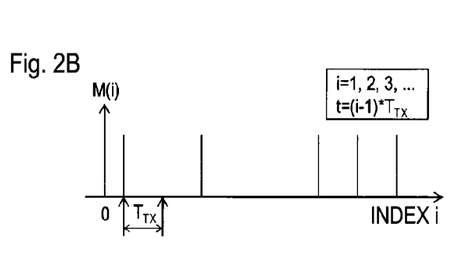
Figure 2C:
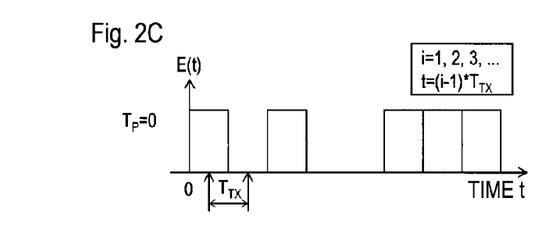
Figure 2D:
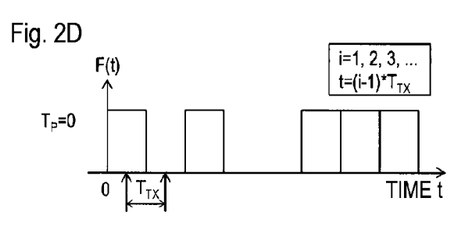
Figure 2E:
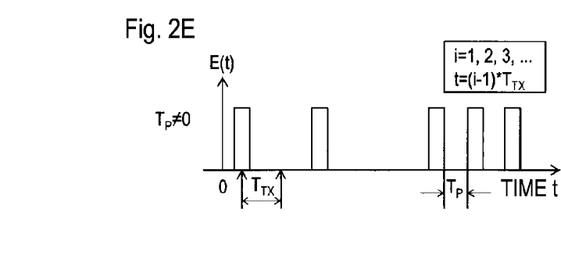
Figure 2F:
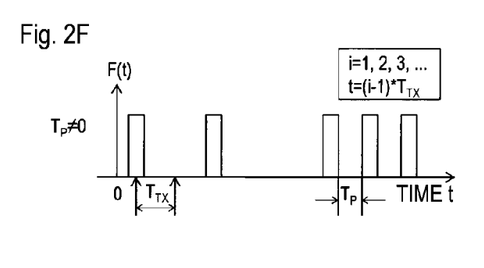

The modulation unit 81 of the transmitter 8 receives an input of a digital transmission signal S(i) (see FIG. 2A), modulates the transmission signal S(i), and outputs a modulated signal M(i) of 0 or 1 only (switch on or off) (see FIG. 2B). Such a modulation method is referred to as an on-off modulation. Here, i is an index indicating time, and is an integer representing the number of the transmission signal. The modulation unit 81 generates a sequence M(1), M(2), ... of the modulated signals M(i) of a sequence S(1), S(2), ... of the input transmission signal S(i), and outputs the sequence M(1), M(2), ... of the modulated signal M(i). The transmission signal S(i) and the modulated signal M(i) are both 1 bit information.

For example, in a case where a sequence of transmission signals is S(1)=0, S(2)=1, S(3)=1, S(4)=1, the modulation result is M(1)=0, M(2)=1, M(3)=1, M(4)=1.

Transmitter 8: Light Emitting Signal Control Unit 821

The light emitting signal control unit 821 outputs the electrical signal E(t) for driving the light emitting element 822 in accordance with the modulated signal M(i) (see FIG. 2C). However, the M(i) is a temporally discrete signal while the E(t) is a temporally continuous signal. The light emitting element 822 repeatedly emits and turns off light in accordance with the electrical signal E(t) and outputs the optical signal F(t) (see FIG. 2D). An output time of the electrical signal E(t) corresponding to the index i of time is defined as a predetermined time width $T_{TX}$ centered on the time indicated by the index i. Hereinafter, $T_{TX}$ is referred to as a flashing period.

Specifically, in a case where the input modulated signal M(i) is 1, the light emitting signal control unit 821 provides an electrical signal to the light emitting element 822 from the time $i*T_{TX}-T_{TX}/2+T$ (where T is a delay amount) to the time $i*T_{TX}+T_{TX}/2+T$ when a predetermined period of time $T_{TX}$ ($T \leq T_{TX}$) has elapsed. In a case where the input modulated signal M(i) is 0, an electrical signal is not provided to the light emitting element 822 from the time $i*T_{TX}-T_{TX}/2+T$ to the time $i*T_{TX}\ T_{TX}/2+T$ when the predetermined period of time $T_{TX}$ has elapsed. Note that in the example of FIG. 2, the delay amount T equals to $(-T_{TX}/2)$. The light emitting element 822 emits light based on the electrical signal E(t) provided from the light emitting signal control unit 821. In this way, the optical signal F(t) is output from the light emitting unit 82.

Depending on the performance of the light emitting signal control unit 821, it may take time to control the light emitting element 822 and may not be able to emit light during the processing time $T_P$. In such a case, in a case where the input modulated signal M(i) is 1, an electrical signal is provided to the light emitting element 822 from the time $i*T_{TX}-T_{TX}/2+T_P/2+T$ to the time $i*T_{TX}+T_{TX}/2-T_P/2+T$ when a predetermined period of time $T_{TX}-T_P$ has elapsed. In a case where the input modulated signal M(i) is 0, an electrical signal is not provided to the light emitting element 822 from the time $i*T_{TX}-T_{TX}/2+T_P/2+T$ to the time $i*T_{TX}+T_{TX}/2-T_P/2+T$ when the predetermined period of time $T_{TX}-T_P$ has elapsed (see FIG. 2E). The light emitting element 822 outputs the optical signal F(t) in accordance with the electrical signal E(t) provided from the light emitting signal control unit 821 (see FIG. 2F). With these operations, the optical signal F(t) is output from the light emitting unit 82.

Transmitter 8: Light Emitting Element 822

The light emitting element 822 outputs the optical signal F(t) in accordance with the electrical signal E(t). The light emitting element 822 can be, for example, an LED. Note that, as illustrated in FIG. 2D, the index i has a predetermined time width $T_{TX}$. However, when a temporally discrete signal is represented, a point of time (e.g., a center time) in the time width indicated by the index i is also represented by i. For example, when a discrete signal is represented, the difference between a time represented by index i and a time represented by i+1 is $T_{TX}$. Furthermore, in addition to delay, it may take time to control the light emitting element 822 as illustrated in FIG. 2F, and when the time required for processing is $T_P$, the light emission time per index is $T_{TX}-T_P$.

Receiver 9: Light Receiving Element 911

The light receiving element 911 receives an optical signal F'(t) obtained by superimposing noise on the optical signal F(t) output from (the light emitting element 822 of) the transmitter 8. F(t) ideally equals to F'(t) but the relationship may vary depending on the performance and delay of the photodetector, and thus F(t) and F'(t) will be described separately. It is assumed that F'(t+T) approximately equals to F'(t). The light receiving element 911 is, for example, a photodetector, or an image sensor, a high-speed camera, or the like in which photodetectors are arranged in a lattice shape. An optical lens may also be provided at the preceding stage of the light receiving element 911.

Figure 3:
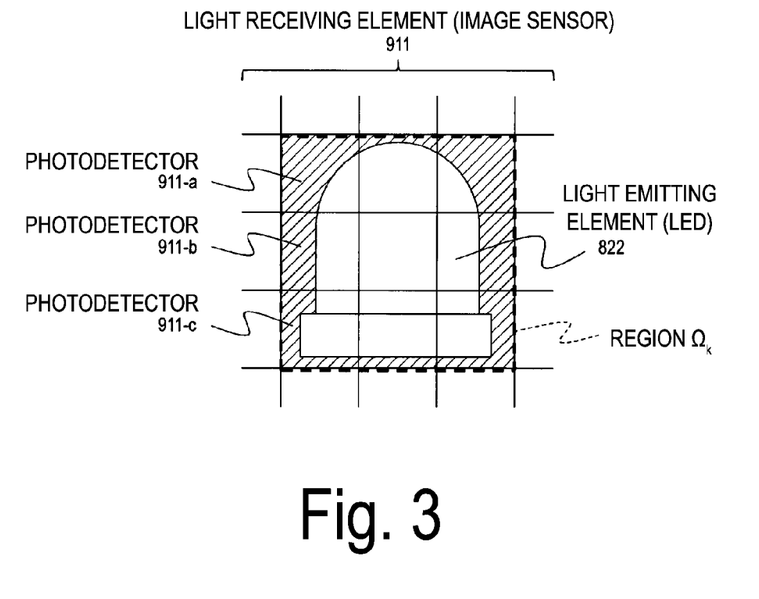
FIG. 3 is a diagram illustrating a light emitting element and a light receiving element.

An example of implementing a light emitting element and a light receiving element in the related-art visible light communication system 900 will be described with reference to FIG. 3. FIG. 3 illustrates a light emitting element and a light receiving element in the related-art visible light communication system 900. As illustrated in FIG. 3, in the related-art visible light communication system 900, for example, the light emitting element 822 may be an LED element. The light receiving element 911 can also be implemented as an image sensor including photodetectors 911-a, b, c, . . . . It is assumed that as illustrated in FIG. 3, flashing of the light emitting element 822 represented by the index i is imaged to a region SI, on the image sensor (the shaded portion surrounded by the dotted line in FIG. 3) (k is the number of the transmitter 8). The receiver 9 captures the sum of the output values of all of the photodetectors in the region $\Omega_k$ as the received signal from the k-th transmitter 8.

Receiver 9: Synchronization Unit 92

It is common to encode original information in some way when information is transmitted in a communication path. The signal of the smallest unit constituting encoded information is referred to as a symbol. In a digital communication path, it is important to detect a clock of a symbol of the transmitter (information representing a time width used in transmitting one symbol) on the receiver side to correctly decode the encoded information transmitted from the transmitter by a decoder. This is referred to as symbol clock synchronization between the receiver and the transmitter. It is desirable that symbol clock synchronization be always performed during communicating. This is because there is generally no means for sharing an identical oscillator between the receiver and the transmitter, and thus synchronization may always be shifted.

The synchronization unit 92 estimates and outputs parameters (a parameter $g_c$ representing the synchronization shift and a parameter R representing the maximum luminance) required to correctly decode the optical signal F(t) transmitted from the transmitter 8. Specifically, the following operations of the clock element 921, the symbol timing recovery circuit 922, and the luminance estimation element 923 generate the parameters ($g_c$, R) required for decoding.

Receiver 9: Clock Element 921

The clock element 921 generates a clock.

Receiver 9: Symbol Timing Recovery Circuit 922

The symbol timing recovery circuit 922 uses the clock acquired from the clock element 921 and the electrical signal E'(t) obtained from (the light receiving element 911 of) the light receiving unit 91 to obtain and output a parameter $g_c$ representing a synchronization shift between the clock of the clock element 921 and the clock of the transmitter 8. As the symbol timing recovery circuit 922, a circuit is known which detects a phase difference between two input signals and performs feedback control to synchronize the phases. In the symbol timing recovery circuit, one of the two input signals is an input from the oscillator and the other is to be synchronized.

Receiver 9: Luminance Estimation Element 923

The luminance estimation element 923 uses the electrical signal E'(t) obtained from (the light receiving element 911 of) the light receiving unit 91 to estimate a parameter R representing the maximum luminance (hereinafter, also referred to as "maximum luminance value").

Receiver 9: Decoding Unit 93

The decoding unit 93 decodes the electrical signal E'(t) output from (the light receiving element 911 of) the light receiving unit 91 using a least squares method or the like with the parameter $g_c$ representing the synchronization shift and the parameter R representing the maximum luminance as a clue, and outputs the decoded result M'(j). Herein, "j" is an index indicating time and i typically equals to j. By discretizing the electrical signal E'(t) in some way, the least squares method can be performed in a digital circuit. Note that a configuration may be employed in which a demodulation unit not illustrated in the receiver 9 is provided, and the demodulation unit demodulates the decoded result M'(j) to output the demodulation result S'(j). In this case, the demodulation unit needs to be configured to correspond to the modulation unit 81.

CITATION LIST

Non Patent Literature

Non Patent Literature 1: Toshihihiko KOMINE, Yuichi TANAKA, and Masao NAKAGAWA, "Integrated System of White LED Visible-Light Communication and Electrical Power-Line Communication", IEIEC Technical Report, Institute of Electronics, Information and Communication Engineers, Mar. 12, 2002, Vol. 101, No. 726, pp. 99-104

Non Patent Literature 2: Masanori ISHIDA, Shinichiro HARUYAMA, and Masao NAKAGAWA, "An Analysis of Transmission Speed Limitation in Parallel Wireless Visible Light Communication Systems", IEIEC Technical Report. CS Communication System, Institute of Electronics, Information and Communication Engineers, Jan. 4, 2007, Vol. 106, No. 450, pp. 37-41

SUMMARY OF THE INVENTION

Technical Problem

When a photodetector is used as a light receiving element, a signal can be obtained continuously and thus it is easy to use the related-art symbol timing recovery circuit described above. However, if it is desired to perform symbol clock synchronization by a digital circuit, a somewhat large sampling frequency is required.

On the other hand, if an image sensor is used as a light receiving element, the resulting signal is a sampled signal (discrete time signal). In this case, to perform symbol clock synchronization by the symbol timing recovery circuit, a somewhat large sampling frequency is required. In other words, in order to reconfigure a signal to use the symbol timing recovery circuit, a sampling frequency that is larger than the sampling frequency originally required for communication is required, which has been problematic.

Furthermore, when an image sensor is used as a light receiving element, there is typically a limitation on a throughput (data transmission amount per unit time) between the image sensor and a general processing device of the subsequent stage, and thus the number of pixels×the sampling frequency cannot be greater than a certain value. Due to this, if the sampling frequency is attempted to be increased, the number of pixels must be reduced, and as a result, the number of transmitters whose signals can be received by one receiver must be reduced. On the other hand, when a receiver having an upper limit on the sampling frequency is used, the flashing period of the transmitter must be increased in order to perform accurate symbol clock synchronization (the flashing frequency must be reduced).

In light of the technical problems described above, an object of the present invention is to provide a receiver that can reduce a sampling frequency required for symbol timing recovery compared to the related art.

Means for Solving the Problem

In order to solve the above problems, a receiver according to an aspect of the present invention is a receiver for performing visible light communication with a transmitter, the receiver including a received signal generating unit configured to measure an intensity of an electrical signal corresponding to an optical signal received from the transmitter at a predetermined time interval to generate a sequence of received signals, and a parameter estimation unit configured to use a distribution of received signals estimated from the sequence of received signals to estimate any one or more parameters of a maximum luminance value, a synchronization shift, and a steady noise level, the one or more parameters including at least the maximum luminance value.

Effects of the Invention

According to the present invention, the sampling frequency required for symbol timing recovery can be made smaller than that of the related art.

DESCRIPTION OF EMBODIMENTS

Embodiments of the present invention will be described in detail below with reference to the drawings. Note that components having the identical function are given the identical reference numerals, and redundant descriptions are omitted.

First Embodiment

Figure 4:
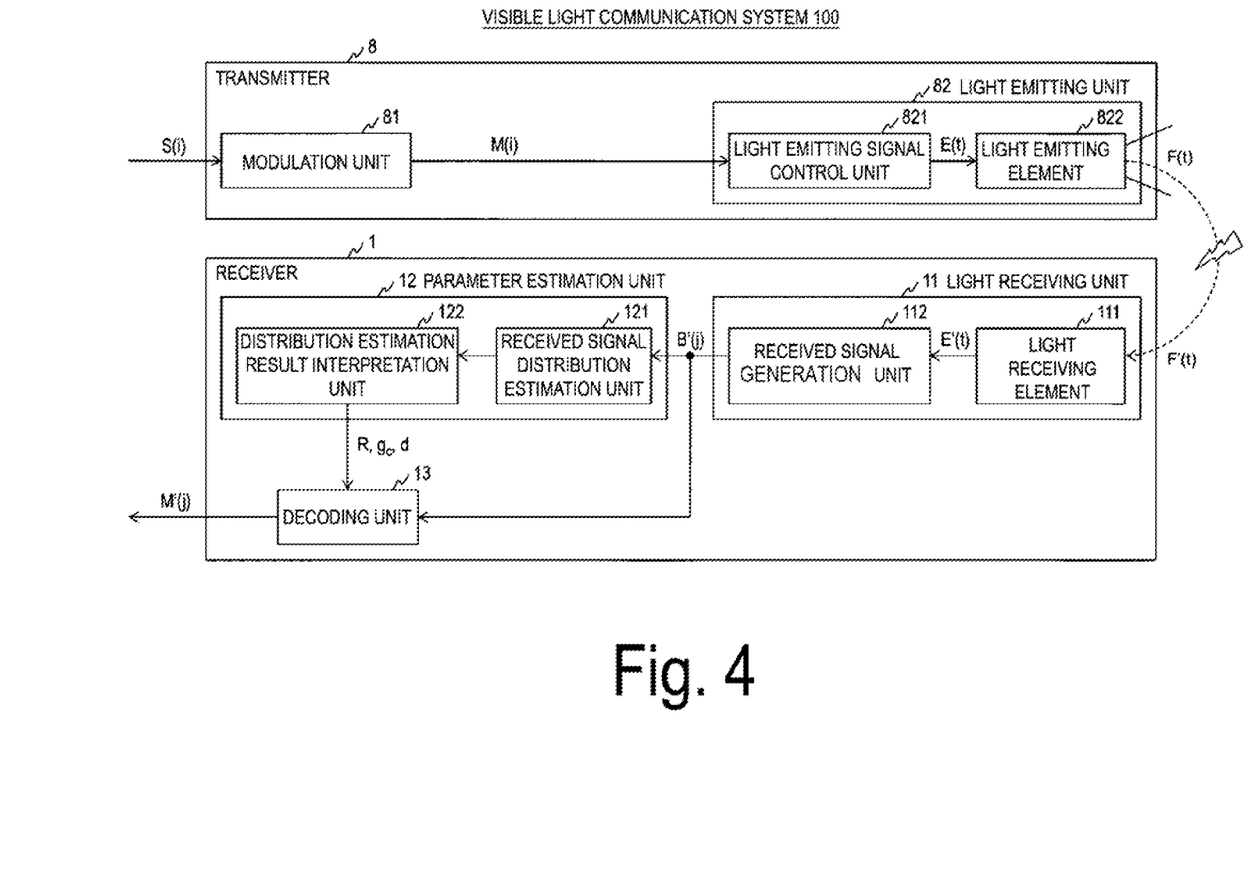
FIG. 4 is a diagram illustrating a functional configuration of a visible light communication system according to an embodiment.

FIG. 4 is a block diagram illustrating a functional configuration of a visible light communication system 100 according to a first embodiment. As illustrated in FIG. 4, the visible light communication system 100 of the first embodiment includes a transmitter 8 and a receiver 1. The transmitter 8 is the identical as the transmitter 8 included in the related-art visible light communication system 900 described above. The receiver 1 includes a light receiving unit 11, a parameter estimation unit 12, and a decoding unit 13. The light receiving unit 11 included in the receiver 1 includes a light receiving element 111 and a received signal generating unit 112. The parameter estimation unit 12 included in the receiver 1 includes a received signal distribution estimation unit 121 and a distribution estimation result interpretation unit 122. The visible light communication system 100 performs processing of each of steps illustrated in FIG. 5 to realize a visible light communication method of the first embodiment. Note that, in the visible light communication method of the first embodiment, a series of steps performed by the receiver 1 is referred to as a receiving method according to the first embodiment.

The receiver 1 is a special apparatus constituted by, for example, a known or dedicated computer including a central processing unit (CPU), a random access memory (RAM), and the like into which a special program is read. The receiver 1, for example, executes each processing under control of the central processing unit. Data input to the receiver 1 and data obtained in each processing are stored in the main memory, for example, and the data stored in the main memory is read out as needed to the central processing unit to be used for other processing. At least a portion of processing units of the receiver 1 may be constituted with hardware such as an integrated circuit.

Hereinafter, a measuring period (hereinafter, also referred to as "sampling period") of the received signal generating unit 112 is $T_{RX}$, an exposure time of the light receiving element 111 is $\tau$, and in the present embodiment, a case in which a flashing period $T_{TX}$ and a measuring period $T_{RX}$ are approximately equal ($T_{TX} \approx T_{RX}$) and a processing time $T_P$ equals to 0 will be described.

Receiver 1: Light Receiving Unit 11

The light receiving element 111 may be a photodetector, for example, as in the related art. An optical lens may also be provided at the preceding stage of the light receiving element 111. Furthermore, the light receiving element 111 may be an image sensor in which photodetectors are arranged in a lattice shape. The received signal generating unit 112 includes a sampling element, a memory, a computing device, and the like.

Receiver 1: Light Receiving Element 111

Figure 5:
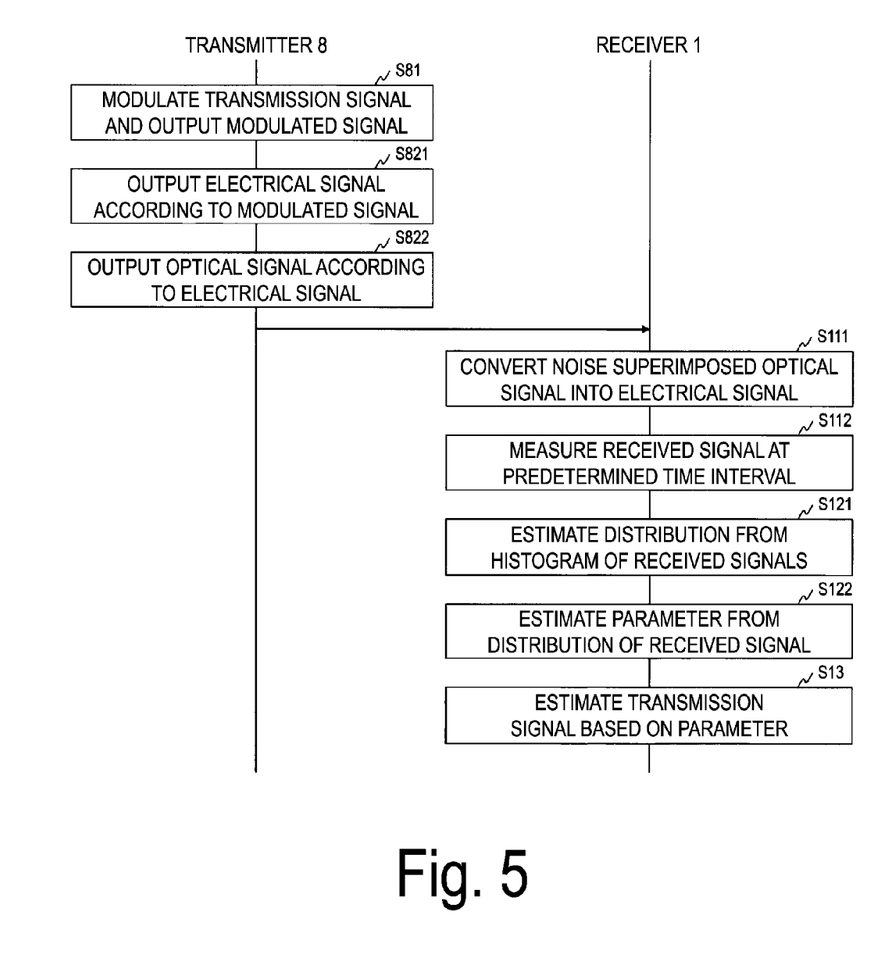
FIG. 5 is a diagram illustrating an operation of the visible light communication system according to the embodiment.

The light receiving element 111 receives an optical signal F'(t) obtained by superimposing noise on an optical signal F(t) output from the transmitter 8, and outputs an electrical signal E'(t) corresponding to the optical signal F'(t) to the received signal generating unit 112 (step S111).

Receiver 1: Received Signal Generating Unit 112

Figure 6:
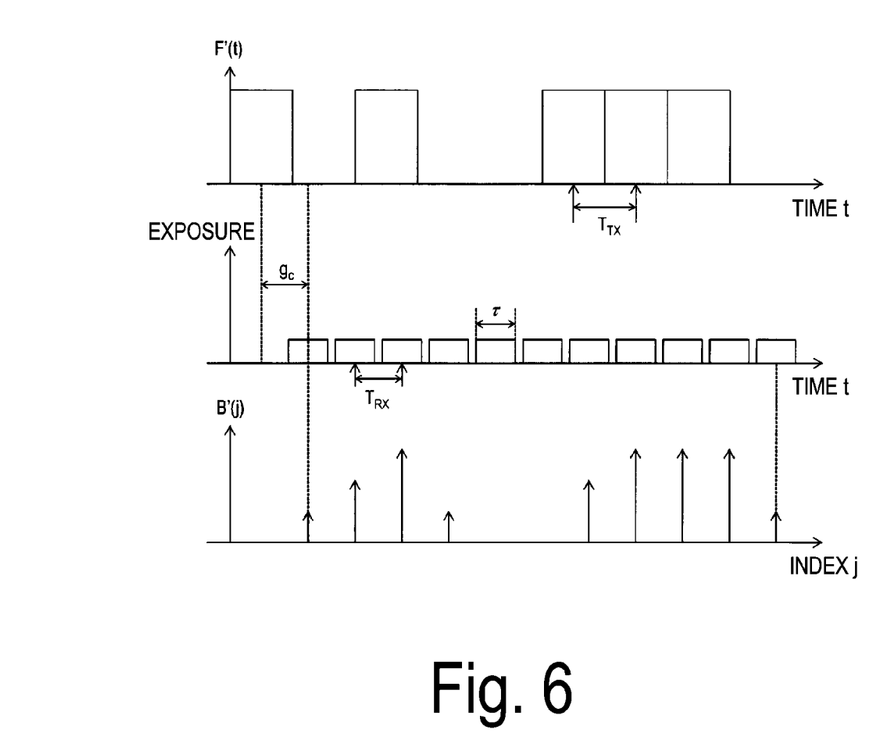
FIG. 6 is an illustrating signals received in visible light communication.

The received signal generating unit 112 measures an intensity of the electrical signal E'(t) at a predetermined time interval $T_{RX}$ ($\approx T_{TX}$) (step S112). When the light receiving element 111 is a single photodetector, as illustrated in FIG. 6, the received signal generating unit 112 measures charges accumulated in the sampling element from a time $g_c*\tau+j*T_{RX}-T_{RX}/2-\tau/2$ to a time $g_c*\tau+j*T_{RX}-T_{RX}/2+\tau/2$, and outputs the measurement result as a sequence of received signals B'(j) per index j. On the other hand, when the light receiving element 111 is an image sensor, as illustrated in FIG. 6, the received signal generating unit 112 measures charges accumulated in the sampling element from a time $g_c*\tau+j*T_{RX}-T_{RX}/2-\tau/2$ to a time $g_c*\tau+j*T_{RX}-T_{RX}/2+\tau/2$ and outputs a result obtained by adding the measurement results within a predetermined range $\Omega_k$ as a sequence of received signals B'(j) per index j.

Receiver 1: Parameter Estimation Unit 12

The parameter estimation unit 12 includes a memory, a computing device, or the like. The parameter estimation unit 12 acquires the sequence of the received signal B'(j) from the received signal generating unit 112, uses the received signal distribution estimation unit 121 and the distribution estimation result interpretation unit 122 to estimate a parameter, and outputs the estimated parameter to the decoding unit 13. Here, the parameter is any one or more parameters of a maximum luminance parameter R, a synchronization shift parameter $g_c$, and a steady noise level parameter d, the one or more parameters including at least the maximum luminance parameter R.

Receiver 1: Received Signal Distribution Estimation Unit 121

The signal distribution estimation unit 121 stores the received signal B'(j) as an input sequentially in the memory. Next, the signal distribution estimation unit 121 estimates a distribution of received signals from a histogram of J received signals B'(j), B'(j+1), . . . , B'(j+J) (step S121). Here, J is an amount determined depending on the flashing period $T_{TX}$, the measuring period $T_{RX}$, the exposure time $\tau$, a magnitude of non-steady noise, and the like. The received signal B'(j) corresponds to a luminance at the time indicated by the time index j. Thus, the distribution of received signals is a distribution representing a frequency of received signals per luminance.

Receiver 1: Distribution Estimation Result Interpretation Unit 122

The distribution estimation result interpretation unit 122 estimates and outputs the maximum luminance parameter R, the synchronization shift parameter $g_c$, and the steady noise level parameter d in the model of Equation (1) from the distribution of received signals estimated by the received signal distribution estimation unit 121 (step S122).

$$B'(j)=R(g_c*S(i)+(1-g_c)*S(i+1))+d \quad (1)$$

More specifically, transmission signals S(i), S(i+1) each take 0 or 1, and thus the possible value of the received signal B'(j) when there is no noise is any one of four values: d (when S(i)=0 and S(i+1)=0); $R*g_c+d$ (when S(i)=1 and S(i+1)=0); $R(1-g_c)+d$ (when S(i)=0 and S(i+1)=1); and R+d (when S(i)=1 and S(i+1)=1). This is utilized to determine the above parameters R, $g_c$, and d from the average of each of 2 to 4 peaks appearing in the histogram of received signals.

Receiver 1: Decoding Unit 13

In step S13, the decoding unit 13 decodes the received signal B'(j) output from the received signal generating unit 112 on the basis of the maximum luminance parameter R, the synchronization shift parameter $g_c$, and the steady noise level parameter d output by the parameter estimation unit 12, and outputs the decoded result M'(j). The method of decoding is similar to that of the decoding unit 93 of the related-art receiver 9. A configuration may be employed in which a demodulation unit that is not illustrated in the identical manner as the related-art receiver 9 described above is provided to demodulate the decoded result M'(j) and output the demodulated result S'(j). In this case, the demodulation unit needs to be configured to correspond to the modulation unit 81.

Second Embodiment

When there is a Plurality of Transmitters

Even when a plurality of the transmitters are present (H (≥2)), the visible light communication system of the present invention can be constituted. In this case, it is only required to provide a plurality of sets (a total of H sets) each of which has the light receiving unit 11, the parameter estimation unit 12, and the decoding unit 13 corresponding to each of the transmitters 8. In this case, the maximum luminance parameter R, the synchronization shift parameter $g_c$, and the steady noise level parameter d are calculated corresponding to each of the transmitters 8. With this configuration, even when there are a plurality of transmitters 8, synchronization can be independently performed on each of the transmitters 8.

The embodiments of the present invention have been described above in detail with reference to the drawings. However, specific configurations are not limited to those embodiments, and include any design change or the like within the scope not departing from the gist of the present invention. The various processing described above in the embodiments may be executed not only in chronological order as described, but also in parallel or individually according to the needs or the processing capability of the apparatus executing the processing.

Program and Recording Medium

When each processing function of each apparatus described in the above embodiments is realized by a computer, processing content of a function that each apparatus should have is described by a program. Then, by executing the program on a computer, various processing functions of each apparatus described above are implemented on the computer.

A program describing the processing content can be recorded on a computer-readable recording medium. As the computer-readable recording medium, for example, any recording medium such as a magnetic recording apparatus, an optical disk, a magneto-optical recording medium, and a semiconductor memory may be used.

Additionally, the distribution of the program is performed, for example, by selling, transferring, and lending a portable recording medium such as a DVD or CD-ROM on which the program is recorded. Further, the program may be stored in a storage unit of a server computer, and the program may be distributed by transferring the program from the server computer to another computer via a network.

A computer that executes such a program, for example, first stores, in a storage unit of the computer, a program recorded on a portable recording medium or a program transferred from a server computer. Then, when executing the processing, the computer reads the program stored in its own storage unit and executes processing in accordance with the read program. Furthermore, as another execution aspect of this program, a computer may directly read a program from a portable recording medium, and execute processing in accordance with the program. Furthermore, each time a program is transferred from a server computer to the computer, processing in accordance with the program received may be sequentially executed. Additionally, a configuration may be employed in which the program is not transferred from the server computer to the computer, but the processing described above is executed by a so-called application service provider (ASP) type service that achieves a processing function only by instructing the execution and acquiring the result. It should be noted that the program of the present embodiment includes information which is used for processing by the electronic computer and which is similar to the program (such as data that is not a direct command to the computer but has a property that defines the processing of the computer).

Additionally, in the present embodiment, although the present apparatus is configured by executing a predetermined program on a computer, at least a portion of these processing contents may be achieved by hardware.

REFERENCE SIGNS LIST 1, 9 Receiver
11, 91 Light receiving unit
12 Parameter estimation unit
92 Synchronization unit
13, 93 Decoding Unit
8 Transmitter
81 Modulation unit
82 Light emitting unit

The invention claimed is:

1. A receiver for performing visible light communication with a transmitter, the receiver comprising:
a received signal generator configured to measure an intensity of an electrical signal corresponding to an optical signal received from the transmitter at a predetermined time interval to generate a sequence of received signals; and
a parameter estimator configured to use a distribution of received signals estimated from the sequence of received signals to estimate any one or more parameters of a maximum luminance value, a synchronization shift, and a steady noise level, the one or more parameters including at least the maximum luminance value.

2. The receiver according to claim 1, wherein the parameter estimator includes:
a received signal distribution estimator configured to generate a histogram representing a frequency of the received signals per luminance from the sequence of received signals; and
a distribution estimation result interpreter configured to determine the one or more parameters from an average of each of peaks appearing in the histogram.

3. The receiver according to claim 2, wherein the distribution estimation result interpreter, when R is taken as the maximum luminance value, $g_c$ is taken as the synchronization shift, d is taken as the steady noise level, and an average of each of peaks appearing in the histogram is taken as any of d, $R*g_c+d$, $R(1-g_c)+d$, and $R+d$, determines the maximum luminance value R, the synchronization shift $g_c$, and the steady noise level d.

4. The receiver according to claim 3, further comprising:
a decoding unit configured to decode the received signals based on the one or more parameters estimated by the parameter estimator.

5. The receiver according to claim 2, further comprising:
a decoding unit configured to decode the received signals based on the one or more parameters estimated by the parameter estimator.

6. The receiver according to claim 1, further comprising:
a decoder configured to decode the received signals based on the one or more parameters estimated by the parameter estimator.

7. The receiver according to claim 1, the receiver further comprising:
a light receiver configured to receive visible light communication from the transmitter.

8. A receiving method performed by a receiver configured to perform visible light communication with a transmitter, the method comprising:
measuring, by a received signal generator, an intensity of an electrical signal corresponding to an optical signal received from the transmitter at a predetermined time interval to generate a sequence of received signals; and
using, by a parameter estimator, a distribution of received signals estimated from the sequence of received signals to estimate any one or more parameters of a maximum luminance value, a synchronization shift, and a steady noise level, the one or more parameters including at least the maximum luminance value.

9. The receiving method according to claim 8, wherein the parameter estimator includes:
generating, by a received signal distribution estimator, configured to generate a histogram representing a frequency of the received signals per luminance from the sequence of received signals; and
determining, by a distribution estimation result interpreter configured to determine the one or more parameters from an average of each of peaks appearing in the histogram.

10. The receiving method according to claim 9, wherein the distribution estimation result interpreter, when R is taken as the maximum luminance value, $g_c$ is taken as the synchronization shift, d is taken as the steady noise level, and an average of each of peaks appearing in the histogram is taken as any of d, $R*g_c+d$, $R(1-g_c)+d$, and R+d, determines the maximum luminance value R, the synchronization shift $g_c$, and the steady noise level d.

11. The receiving method according to claim 10, further comprising:
    decoding, by a decoder, the received signals based on the one or more parameters estimated by the parameter estimator.

12. The receiving method according to claim 9, further comprising:
    decoding, by a decoder, the received signals based on the one or more parameters estimated by the parameter estimator.

13. The receiving method according to claim 8, the method further comprising:
    decoding, by a decoder, the received signals based on the one or more parameters estimated by the parameter estimator.

14. The receiving method according to claim 8, the method further comprising:
    receiving, by a light receiver, visible light communication from the transmitter.

15. A computer-readable non-transitory recording medium storing computer-executable program instructions for performing visible light communication with a transmitter when executed by a processor cause a computer to:
    measure, by a received signal generator, an intensity of an electrical signal corresponding to an optical signal received from the transmitter at a predetermined time interval to generate a sequence of received signals; and
    use, by a parameter estimator, a distribution of received signals estimated from the sequence of received signals to estimate any one or more parameters of a maximum luminance value, a synchronization shift, and a steady noise level, the one or more parameters including at least the maximum luminance value.

16. The computer-readable non-transitory recording medium according to claim 15, wherein
    the parameter estimator includes:
    a received signal distribution estimator configured to generate a histogram representing a frequency of the received signals per luminance from the sequence of received signals; and
    a distribution estimation result interpreter configured to determine the one or more parameters from an average of each of peaks appearing in the histogram.

17. The computer-readable non-transitory recording medium according to claim 16, wherein
    the distribution estimation result interpreter, when R is taken as the maximum luminance value, $g_c$ is taken as the synchronization shift, d is taken as the steady noise level, and an average of each of peaks appearing in the histogram is taken as any of d, $R*g_c+d$, $R(1-g_c)+d$, and R+d, determines the maximum luminance value R, the synchronization shift $g_c$, and the steady noise level d.

18. The computer-readable non-transitory recording medium according to claim 17, the computer-executable instructions when executed further causing the system to:
    decode, by a decoder, the received signals based on the one or more parameters estimated by the parameter estimator.

19. The computer-readable non-transitory recording medium according to claim 16, the computer-executable instructions when executed further causing the system to:
    decode, by a decoder, the received signals based on the one or more parameters estimated by the parameter estimator.

20. The computer-readable non-transitory recording medium according to claim 15, the computer-executable instructions when executed further causing the system to:
    decode, by a decoder, the received signals based on the one or more parameters estimated by the parameter estimator.

* * * * *